United States Patent
Frederiksen et al.

(10) Patent No.: US 6,185,295 B1
(45) Date of Patent: Feb. 6, 2001

(54) PHONE NUMBER DATABASE FOR A PHONE

(75) Inventors: Steen Lillethorup Frederiksen, Allerød; Peter Ib, Herlev, both of (DK); Erik Paul Anderson, Turku (FI)

(73) Assignee: Nokia Mobile Phones Limited, Espoo (FI)

( * ) Notice: Under 35 U.S.C. 154(b), the term of this patent shall be extended for 0 days.

(21) Appl. No.: 09/025,348

(22) Filed: Feb. 18, 1998

(30) Foreign Application Priority Data

Feb. 21, 1997 (GB) .................................................. 9703643

(51) Int. Cl.⁷ ........................... H04M 11/00; H04M 1/274
(52) U.S. Cl. ......................... 379/355; 379/216; 455/564
(58) Field of Search ................................. 379/354, 355, 379/356, 216; 455/564, 565, 558

(56) References Cited

U.S. PATENT DOCUMENTS

| | | | |
|---|---|---|---|
| 5,134,717 | * 7/1992 | Rasmussen | 455/89 |
| 5,267,308 | * 11/1993 | Jokinen et al. | 379/354 |
| 5,363,437 | 11/1994 | Shen et al. | 379/355 |
| 5,491,745 | * 2/1996 | Roeder | 379/355 |
| 5,509,067 | 4/1996 | Murata | 379/355 |
| 5,535,258 | * 7/1996 | Joglekar et al. | 379/58 |
| 5,675,630 | * 10/1997 | Beatty | 379/59 |
| 5,687,216 | * 11/1997 | Svensson | 379/58 |
| 5,692,032 | 11/1997 | Seppanen et al. | 379/59 |
| 5,812,946 | * 9/1998 | Nakabayashi et al. | 455/426 |
| 5,963,875 | * 10/1999 | Go | 455/564 |
| 5,963,876 | * 10/1999 | Manssen et al. | 455/564 |
| 5,991,396 | * 11/1999 | Salm et al. | 379/355 |

FOREIGN PATENT DOCUMENTS 0 709 996 A2    5/1996   (EP) .

* cited by examiner

Primary Examiner—David R. Hudspeth
Assistant Examiner—Abul K. Azad
(74) Attorney, Agent, or Firm—Perman & Green, LLP

(57) ABSTRACT

A phone number database has a first group of memory locations with associated speed dialing facility and a second group of memory locations without speed dialing facility. A phone number may be provided with speed dialing facility when this phone number is already stored without speed dialing facility in the second group by indicating the phone number whose speed dialing status is to be changed, indicating a memory location with a phone number with the desired speed dialing status, and interchanging the speed dialing status of the two phone numbers.

12 Claims, 3 Drawing Sheets

| Memory location no. | Name | Phone no. |
|---|---|---|
| 1 | voice mail box | +45 50 50 50 50 |
| 2 | Gill | +46 59 3111 45 |
| 3 | Jane | +49 89 600 0662 |
| 4 | Carl | +44 1233 4561 |

• • •

| | | |
|---|---|---|
| 65 | Freddy | +43 1 789 1233 |
| 66 | Bob | +32 2 323 1233 |
| 67 | John | +39 35 200 222 |
| 68 | Ben | +1 123 123 3123 |
| 69 | Jackie | +358 0 444 444 |

• • •

| Memory location no. | Name | Phone no. |
|---|---|---|
| 1 | voice mail box | +45 50 50 50 50 |
| 2 | Gill | +46 59 3111 45 |
| 3 | Jane | +49 89 600 0662 |
| 4 | Carl | +44 1233 4561 |
| ... | | |
| 65 | Freddy | +43 1 789 1233 |
| 66 | Bob | +32 2 323 1233 |
| 67 | John | +39 35 200 222 |
| 68 | Ben | +1 123 123 3123 |
| 69 | Jackie | +358 0 444 444 |

...

PHONE NUMBER DATABASE FOR A PHONE

BACKGROUND OF THE INVENTION

The invention relates to a method of transferring a phone number already stored in a phone number database of a phone from a memory location without speed dialing facility to a memory location with speed dialing facility, without this causing loss of information already saved. The invention moreover relates to a phone for performing the method.

Hand-portable phones give the user the possibility of storing a plurality of phone numbers electronically. The actual storage may take place in a RAM in the phone, but will typically take place in a memory on a SIM card, and the resulting database will follow the SIM card and thus the phone subscription instead of the phone. The user may typically save 50–100 phone numbers having up to 30 digits and an associated name of about letters. These data may vary from SIM card supplier to SIM card supplier. The phone numbers will typically be stored in serially numbered memory locations, e.g. 1–100. A group of phone numbers—typically the numbers stored in the memory locations 2–9—will be accessible as short dialing numbers, which means that in the idle mode of the phone the user can make a call to a phone number stored in e.g. location #3 by depressing the "3" key for e.g. 0.5–1.0 second.

This feature, convenient and very useful to the user, is available only to a small group of numbers in the total number database. It may frequently be expedient to add new numbers to the group of speed dialing numbers, since the phone numbers most frequently called frequently change. It will be possible to overwrite an existing memory location in the speed dialing number group by adding a new number, but this will involve loss of data, which will thus have to be entered again. Further, it is not desired to extend the group of speed dialing numbers, since it will be too difficult to remember the short dialing code for speed dialing numbers used less frequently.

SUMMARY OF THE INVENTION

The invention comprises a method of providing a phone number with speed dialing facility when said phone number is already stored without speed dialing facility in a phone number database, which has a first group of memory locations with associated speed dialing facility and a second group of memory locations without speed dialing facility, said method comprising indicating the phone number whose speed dialing status is to be changed, indicating a memory location with a phone number having the desired speed dialing status and interchanging the speed dialing status of the two phone numbers.

A phone number may hereby be given a desired speed dialing status by a simple operation, the only expense to the database being that a phone number already having this status merely loses it. No information is lost or has to be entered again.

The invention provides a method enabling the user with few instructions to transfer numbers already stored to the group of speed dialing numbers without losing information already saved.

In a preferred embodiment, the contents of one memory location are saved temporarily, and then the contents of the other memory location are transferred to the first location. The contents are then transferred from the intermediate memory to the other location. The interesting point of swapping the contents of the two memory locations is that the information is maintained, it being just the phone numbers which change status because of their shift in memory location.

When the phone book is entered according to the preferred embodiment, one or more items will be displayed on the display. The phone will have a scroll key by means of which the user may scroll through the list of items. The selected item will be indicated, optionally highlighted, on the display. When the user has found the item whose status he wishes to change, he is to select a destination address. As the group of memory locations with associated speed dialing facility is stored on the locations 2–9, the destination memory location is expediently selected by long depression of a one of the keys 2–9. If, e.g. the memory locations 2–19 had the speed dialing facility, the location 18 might be selected as the destination memory location by ordinary entering of "1", while "8" was depressed for an extended period of time (long press).

The invention moreover relates to a telephone, radio telephone or handset having a phone number database having a first group of memory locations with associated speed dialing facility and a second group of memory locations without speed dialing facility. Such a phone number database may be called an electronic phone book, and it is the user of the phone who handles the contents of the database. The phone has a display on which at least a part of the contents of the of the phone number database may be displayed, a cursor for visual identification of an item on the display and a positioning device for moving the cursor between items on the display. Further, the phone has another identification device for selecting a memory location among the first group of memory locations with associated speed dialing facility, and a device for interchanging the speed dialing status of the two identified phone numbers. The preferred embodiment makes it possible, in a particularly simple procedure, to update the contents of the group of memory locations with associated speed dialing facility by transferring information already stored to one of these memory locations, without losing the information originally contained in the memory location concerned. Instead, this information is saved in the memory location whose contents have just been transferred to the group of memory locations with associated speed dialing facility.

Swapping of the contents of the two memory locations takes place in practice in that an intermediate memory receives the contents of the memory location to be transferred to the group of memory locations with associated speed dialing facility. This location is identified with a cursor in the display. The controller of the phone then transfers the contents of the memory location which has till now belonged to the group of memory locations with associated speed dialing facility to the memory location whose contents have just been transferred to the intermediate memory. When this has been done, the controller transfers the contents of the intermediate memory to the memory location which was selected as the reception location for the phone number which is to be provided with a speed dialing facility.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
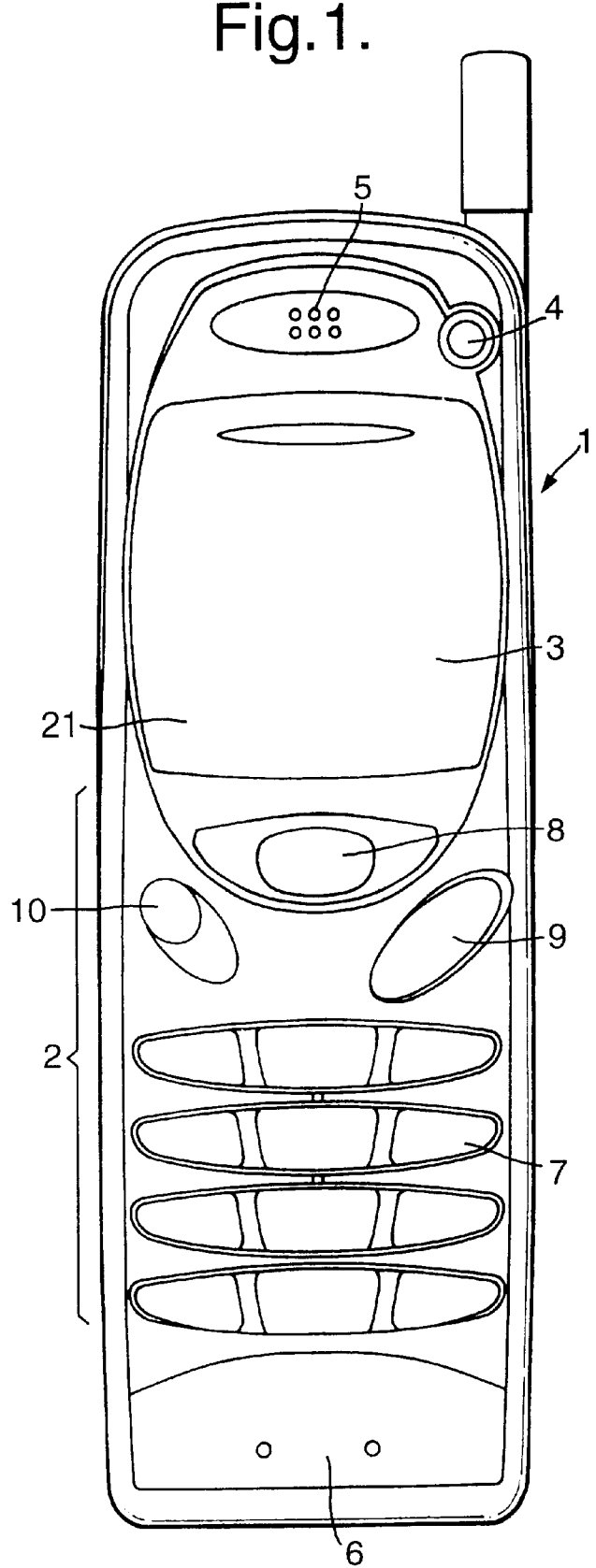
FIG. 1 shows a preferred embodiment of a portable phone having a user interface according to the invention.

FIG. 1 shows a preferred embodiment of a radiophone according to the invention, and it will be seen that the phone, which is generally designated by 1, comprises a user interface having a keypad 2, a display 3, an on/off button 114, an earpiece 5, and a microphone 6. The keypad 2 has a first group 7 of keys in the form of alphanumeric keys, by means of which the user can enter a phone number, write a text message (SMS), write a name (associated with the phone number), etc. The user uses the first group of keys primarily for entering data in the phone (entry events).

The keypad 2 additionally comprises a second group of keys which, in the preferred embodiment, comprises precisely one multi-functionality key 8 or soft key whose function depends on the present state of the phone. The default function or the present function of the multi-functionality key 8 is displayed in a predetermined area 21 of the display 3. In the preferred embodiment, the second group of keys additionally comprises a scroll key 9 by means of which the user can jump selectively from one item to the preceding or the succeeding item in the menu loop of the phone, while he gets access to a submenu loop under the item concerned in the main menu loop by activation of the operation key. The clear key 10 may be used e.g. for erasing the digit or letter entered last by brief depression, while depression of a longer duration will erase the entire number of word. Like the multi-functionality key 8, the scroll key 9 and the clear key 10 may advantageously be redefined in some states, which appears from the following.

Figure 4:
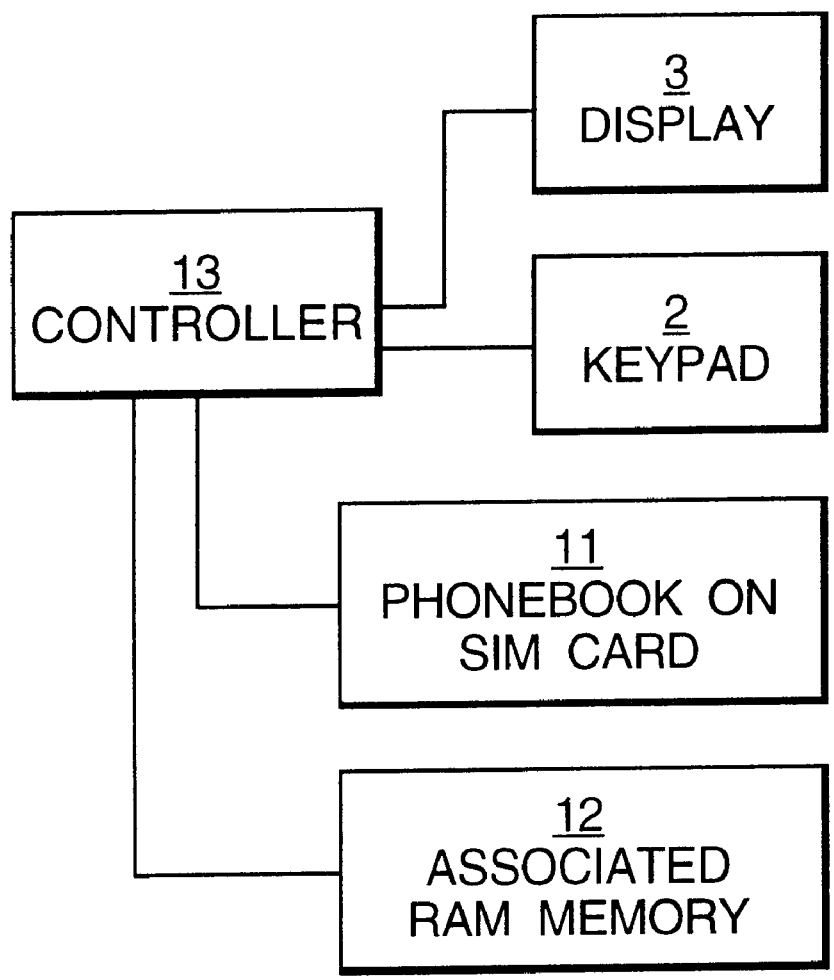
FIG. 4 illustrates the cooperation between the controller, the SIM card memory and an intermediate memory according to a preferred embodiment of the invention.

A preferred embodiment of the invention will be described below with reference to FIGS. 2–4. In the preferred embodiment, a controller 13 may be formed by the physical layer processor of the phone which, as will be known to a skilled person, monitors i.a. the cellular network, handles the call establishment and otherwise controls the user interface of the phone. The controller 13 is thus connected to both the keypad 2 and the display 3.

Further, the controller 13 controls the memories of the phone, including the storage of phone numbers in the phone book memory, which is an external memory 11 on the SIM card of the phone in the preferred embodiment. This memory is designed so as to be addressed by a memory location number, and, for each phone number, is capable of accommodating a plurality of signs, e.g. 14, for the identification of the phone number proprietor, a plurality of signs, e.g. 30, for the phone number itself, said memory 11 typically having 50–100 memory locations. However, these amounts vary considerably from card supplier to card supplier.

Several internal memories 12 are provided in connection with the controller 13 for the temporary storage of information, which is entered with the keypad 2, is shown on the display 3 or is received via the cellular network.

Figures 2, 3:
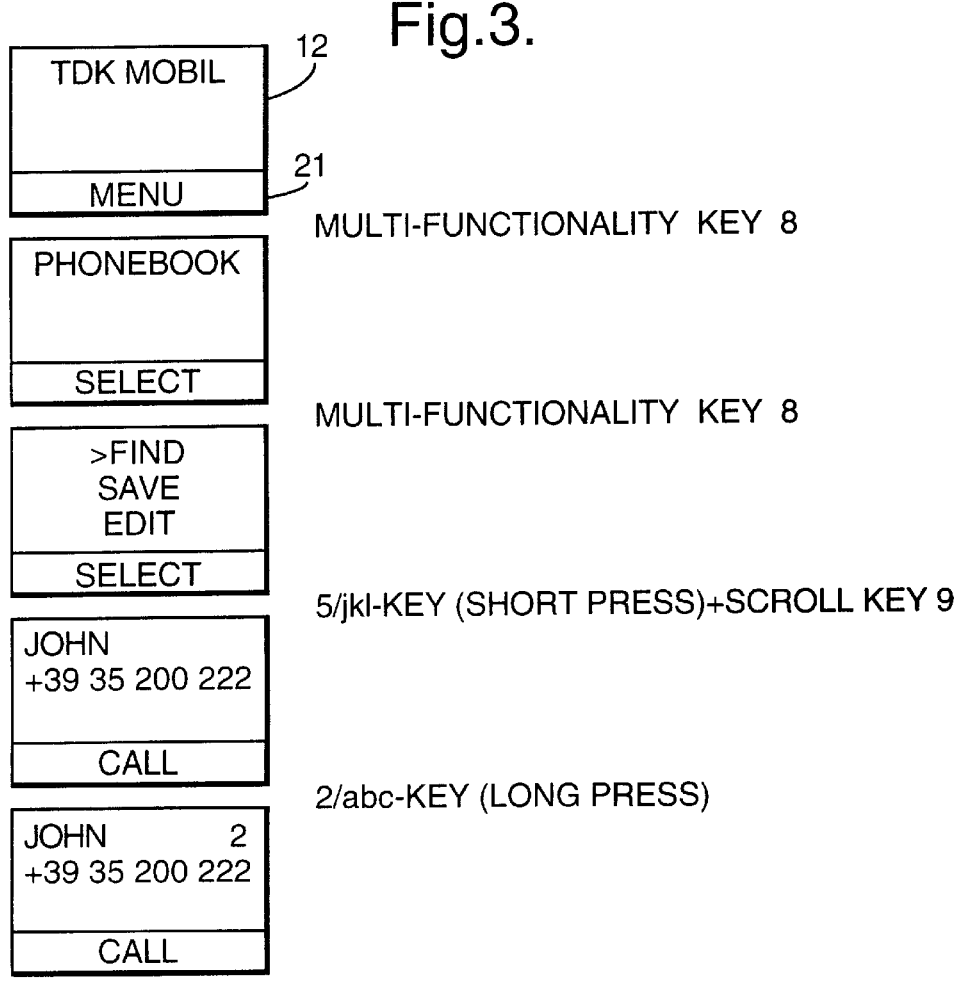
FIG. 2 schematically shows an example of the contents of a phone book stored on the SIM card of the phone.
FIG. 3 shows a sequence of display images in connection with swapping of memory locations in the phone book.

The structure of the memory 11 on the SIM card is illustrated in FIG. 2. The card supplier usually stores the number of a mail box service on memory location 1, for which reason the memory locations 2–9 may be provided with speed dialing facility, as the user will be able to make a call in the idle mode of the phone to the number stored in memory location #4 merely by e.g. depressing the figure "4" for 0.8 second.

FIG. 2 schematically shows a section of a phone book memory 11 in which the memory locations #1–4 and #65–69 are shown, while the rest is left out for clarity. Names as well as numbers are purely fictitious and just serve purposes of illustration. Usually, the user of the phone builds up the phone book database through occasional entering of phone numbers. Since, at the same time, the numbers most frequently called from a phone change dynamically, there is a need for a simple and effective way of changing the status of already stored numbers with respect to speed dialing. The preferred embodiment of the invention will be explained below on the basis that the user wants "John"'s phone number, stored in memory location #67, to be provided with speed dialing facility. The user wants this speed dialing facility to be obtained from "Gill"'s memory location (memory location #2).

As shown, this procedure proceeds with the five display images shown in FIG. 3 in the preferred embodiment. In the idle mode of the phone, the display image 3 contains information on the network operator concerned, which is TDK Mobil here. Further, a predetermined part 21 of the display contains information on the present functionality of the multi-functionality key 8, which is here access to the main menu of the phone. The phone book is the first item in the main menu loop, and the user, with a single activation of the multi-functionality key 8, therefore arrives at the phone book with the display image shown as the second image in the sequence. It is indicated in the display that the phone book may be selected by depressing the multi-functionality key 8. If the user does not wish to select the phone book, he may move further on in the main menu loop by means of the scroll key 9. By depressing the multi-functionality key 8 once more, the phone enters a phone book mode, it being possible for the user to select a phone number handling option, such as "Find", "Save" and "Edit" shown in the third display image. The user may here run through the entire group of options by means of the scroll key 9 and select an option by means of the multi-functionality key 8 when the option is indicated by the ">" sign. The phone arranges the stored names alphabetically, and the user may therefore scroll through the alphabetic name list by means of the scroll key 9. This sorting does not take the memory location number into consideration, and, therefore, the user is only informed of this for numbers which have speed dialing status. The alphabetic name list is endless, i.e. turns around after the last item on the list. Only the location addresses of phone numbers having the speed dialing facility are shown on the display.

The user may get into the alphabetic name list in several ways. Firstly, by selecting "Find" and entering the name "John", he may arrive directly at "John"'s phone number. Alternatively, when the phone book has been selected and the phone number handling options have been presented, the user may depress one of the alphanumeric keys, causing the first name corresponding to the alphanumeric value of the key to be displayed on the display. If there are no other names beginning with "J" in the phone book, "Jane" will be the first name which is shown after the activation of the "5/jkl" key, and depression of the scroll key 9 in the scroll-down direction will cause "John" to be shown immediately afterwards, as is the case here, or after a number of depressions if there are several names between the two in the phone book.

The indication of the phone number whose speed dialing status is to be changed takes place in the preferred embodiment in that the number is shown solely on the display. The display thus serves as a cursor in the preferred embodiment. Alternatively, the number might be indicated e.g. by highlighting it among a group of numbers from the phone book shown on the display.

In connection with the indication of "John", the default function of the multi-functionality key 8 will be to make a call to "John". When, instead, the "2/abc" key is depressed for more than e.g. 0.8 sec. (long press), the memory location #2 will be selected as destination memory location (and thereby indicated by a memory location with a phone number having the desired speed dialing status) for the contents of the memory location shown (here memory location #67). In the preferred embodiment, the actual interchange of the speed dialing status of the two phone numbers takes place by swapping the numbers between the two memory locations.

When "John"'s phone number is shown on the display, a copy of memory location #67 may already have been saved in the RAM 12 for intermediate storage of the contents of one of the two indicated memory locations. The controller 13 will hereby be able to transfer the contents of the destination memory location (here memory location #2) to the memory location having the phone number which is to be given speed dialing facility. When this has been done, the contents of the memory location #67, now just saved in the RAM 12, may be transferred finally to the destination memory location, whereby the swapping of the two phone numbers is completed. As the location address #2 for "John"' phone number has speed dialing facility, this is indicated on the display in the last image in the sequence by the display of a "2" figure, which also confirms that the swapping has been completed successfully.

It should be noted that the period of time separating long press and short press may vary within wide limits, but 0.8 sec. +/−0.4 sec. will usually be preferred. It should moreover be noted that long press of a number key in the phone book mode will cause swapping of the two numbers, while, in idle mode, it will cause calling the number stored on the speed dialing address concerned. Finally, depression of the number key in the phone book mode for a shorter duration of time will cause displaying of another number instead of swapping of two numbers. Thus, it is clear that the order is carried out only when the key is released.

The swapping may also be performed even if the two indicated memory locations do not contain phone numbers.

Alternatively, the contents of the destination memory location may be saved temporarily in the RAM 12, following which the controller 13 transfers the contents of the memory location having the phone number to be given speed dialing facility to the destination memory location (here memory location #2). When this has been done, the contents of the memory location #67, now just saved in the RAM 12, may be transferred finally to the destination memory location, whereby the swapping of the two phone numbers is completed.

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of handling speed dialing status of phone numbers stored in a phone number database, having a first group of memory locations being associated with speed dialing facilities and a second group of memory locations without speed dialing facilities, the method comprising the steps of:

selecting a first phone number whose speed dialing status is to be changed wherein the first number is stored in a first memory location in one of the first and second groups of memory locations;

designating a second phone number, wherein the second phone number is stored in a second memory location having the desired speed dialing status in another one of the first and second groups of memory locations; and swapping a content of the first memory location with a content of the second memory location in order to interchange the speed dialing status of the two phone numbers, the swapping of the content of the two memory locations comprising the steps of:

temporarily storing the contents of one of the two selected memory locations in an intermediate memory;

transferring the contents of the other of the two memory locations to the memory location whose contents are temporarily stored in the intermediate memory; and transferring the contents of the intermediate memory to the memory location whose contents have been transferred to the other memory location.

2. A method according to claim 1, wherein the step of selecting a first phone number whose speed dialing status is to be changed comprises:

finding and displaying the phone number whose speed dialing status is to be changed in a phone number list from the phone number database; and pressing a number key corresponding to the designated member location address.

3. A method according to claim 2, wherein phone numbers in memory locations having a one-digit address may be called by pressing a number key corresponding to the one digit address for a first predetermined period of time when the phone is in an idle mode, and wherein a designation of the memory location with the phone number having the desired speed dialing status comprises depressing a number key corresponding to the address for a second predetermined period of time.

4. A method according to claim 3, wherein phone numbers in memory locations having one-digit addresses may be called by continuous depression of a number key corresponding to the address for a first predetermined period of time when the phone is in idle mode, and wherein indication of the memory location with the phone number having the desired speed dialing status comprises depressing a number key corresponding to the address for a second predetermined period of time.

5. A method according to claim 4, wherein the first predetermined period of time corresponds to the second predetermined period of time.

6. A phone with a phone number database having a first group of memory locations being associated with speed dialing facilities and a second group of memory locations without speed dialing facilities, and moreover comprising;

an input means for inputting instructions into the phone;

a display for displaying information;

a controller connected to the input means and controlling the display of information;

wherein the input means comprises:

means for presenting the content of a first memory location in the display, wherein the phone number stored in the first memory location is desired to become associated with the speed dialing facility;

means for designating a memory location having the desired speed dialing facility; and means for swapping the content of the two memory locations in order to interchange the speed dialing status of the two phone numbers; and wherein the phone further includes:

an intermediate memory for storing the contents of the first memory location whose content is presenting in the display;

means for transferring the contents of the other of the two indicated memory locations to the memory location whose contents are temporarily stored in the intermediate memory; and means for transferring the contents of the intermediate memory to the memory location whose contents have been transferred to the other memory location.

7. A phone according to claim 6, wherein the visual identification of an item on the display comprises:

means for displaying at least a part of the items of the phone number database on the display; and a positioning device in the form of a scroll key for stepwise movement of the cursor between items on the display for indicating the phone number whose speed dialing status is to be changed.

8. A phone according to claim 6, wherein the identification device for selecting a memory location among the first group of memory locations with associated speed dialing facility comprises a numeric keypad, and wherein the selection takes place by activating the keys of the keypad corresponding to the address of the memory location concerned.

9. A phone according to claim 8, wherein the first group of memory locations with associated speed dialing facility has one-digit addresses in the phone number database and may be called by continuous depression of a number key corresponding to the address for a first predetermined period of time when the phone is in idle mode, and wherein the indication of the memory location with the phone number with the desired speed dialing status comprises depression of a number key corresponding to the address for a second predetermined period of time.

10. A phone according to claim 9, wherein the duration of the first predetermined period of time corresponds to the duration of the second predetermined period of time.

11. A phone according to claim 6, wherein the means for designating a memory location among the first group of memory locations with associated speed dialing facility comprises a numeric keypad and wherein the selection takes place by pressing the numeric key corresponding to the address of the designated memory location for a period with a predetermined duration.

12. A phone according to claim 6, wherein the first group and the second group are present in a separate memory of a replaceable subscriber identity module (SIM) card.

* * * * *